(12) United States Patent
Lin et al.

(10) Patent No.: US 9,210,674 B2
(45) Date of Patent: Dec. 8, 2015

(54) BASE STATION TIMING CONTROL USING SYNCHRONOUS TRANSPORT SIGNALS

(75) Inventors: Yifan Lin, Shanghai (CN); Ze Mian Huang, Shanghai (CN); Tao Wang, Shanghai (CN); Lin Sun, Shanghai (CN); Hao Li, Shanghai (CN)

(73) Assignee: Avago Technologies General IP (Singapore) Pte. Ltd., Singpore (SG)

( * ) Notice: Subject to any disclaimer, the term of this patent is extended or adjusted under 35 U.S.C. 154(b) by 910 days.

(21) Appl. No.: 13/429,606

(22) Filed: Mar. 26, 2012

(65) Prior Publication Data

US 2013/0250850 A1 Sep. 26, 2013

(51) Int. Cl.
*H04W 4/00* (2009.01)
*H04W 56/00* (2009.01)
*H04W 92/04* (2009.01)

(52) U.S. Cl.
CPC .......... *H04W 56/001* (2013.01); *H04W 92/045* (2013.01)

(58) Field of Classification Search
None
See application file for complete search history.

(56) References Cited

U.S. PATENT DOCUMENTS

| 6,377,579 | B1 | 4/2002 | Ofek |
| 7,103,044 | B1 * | 9/2006 | Keller et al. ................. 370/392 |
| 7,136,388 | B2 | 11/2006 | Friedrichs et al. |
| 7,660,330 | B1 | 2/2010 | Shmilovici |
| 2002/0154647 | A1 * | 10/2002 | Potash ......................... 370/412 |
| 2004/0037253 | A1 * | 2/2004 | Boland et al. ................ 370/337 |
| 2005/0226231 | A1 | 10/2005 | Skerlj et al. |
| 2007/0189164 | A1 * | 8/2007 | Smith et al. .................. 370/230 |
| 2009/0122813 | A1 * | 5/2009 | Zhang .......................... 370/503 |
| 2011/0019681 | A1 | 1/2011 | Gazier et al. |
| 2012/0008581 | A1 * | 1/2012 | Kojima ......................... 370/329 |
| 2012/0084400 | A1 * | 4/2012 | Almadi et al. ................ 709/219 |

FOREIGN PATENT DOCUMENTS

GB 2460482 A 12/2009
JP 2005110314 A 4/2005

OTHER PUBLICATIONS

RAD Data Communications, "2G, 3G and HSDPA Cellular Traffic Over Packet-Switched Networks (PSNs), SDH/SONET Networks and E1/T1 Transport Links," ACE—3000 Family, ACE—3200, Cell-Site Gateway, Data Sheet, 8 pages.
Dominik Schneuwly, "The Synchronization of 3G UMTS Networks," OSCILLOQUARTZ, Application Note, Aug. 2004, 16 pages, No. 17.

(Continued)

*Primary Examiner* — Afshawn Towfighi
(74) *Attorney, Agent, or Firm* — Suiter Swantz pc llo (57) ABSTRACT

A base station of a wireless system comprises a local clock source and timing circuitry coupled to the local clock source. The timing circuitry is configured to adjust at least one parameter of the local clock source based at least in part on timing information extracted from designated portions of each of one or more frames of a synchronous transport signal received in the base station. The base station may further comprise a physical layer device, such as a mapper, configured to extract the timing information from the designated portions of each of the one or more frames of the synchronous transport signal. The designated portions of the one or more frames of the synchronous transport signal from which the timing information is extracted may comprise designated overhead bytes of the one or more frames, such as, for example, transport overhead (TOH) bytes.

20 Claims, 5 Drawing Sheets (56) References Cited

OTHER PUBLICATIONS

Nir Halachmi, "Delivery of Timing and Circuit Services Using Packet-Based Synchronization," Ethernet Academy Articles, Oct. 2011, 14 pages.

R. Emardson et al., "Time and Frequency Transfer in an Asynchronous TCP/IP Over SDH-Network Utilizing Passive Listening," IEEE International Frequency Control Symposium and Exposition, Aug. 2005, pp. 908-913.

M. Kihara et al., "Two-Way Time Transfer Through 2.4 GBit/s Optical SDH System," 29th Annual Precise Time and Time Interval (PTTI) Meeting, Dec. 1997, pp. 415-422.

Motti Goren, "Telecom Synchronization Over Packet Networks," Lycium Networks, Transporting Legacy to the Future, ITSF 2004, Oct. 2004, 28 pages.

Dr. Yaakov Stein, "TDM Timing," RAD Data Communications, White Paper, Aug. 2006, 16 pages.

M.A. Weiss et al., "Two-Way Time and Frequency Transfer in SONET," IEEE International Frequency Control Symposium, Jun. 1996, pp. 1163-1168.

* cited by examiner

| A1 | A1 | A1 | A2 | A2 | A2 | J0 | J0 | J0 |
|----|----|----|----|----|----|----|----|----|
| B1 | B1 | B1 | E1 | E1 | E1 | F1 | F1 | F1 |
| D1 | D1 | D1 | D2 | D2 | D2 | D3 | D3 | D3 |
| H1 | H1 | H1 | H2 | H2 | H2 | H3 | H3 | H3 |
| B2 | B2 | B2 | K1 | K1 | K1 | K2 | K2 | K2 |
| D4 | D4 | D4 | D5 | D5 | D5 | D6 | D6 | D6 |
| D7 | D7 | D7 | D8 | D8 | D8 | D9 | D9 | D9 |
| D10 | D10 | D10 | D11 | D11 | D11 | D12 | D12 | D12 |
| S1 | S1 | S1 | M1 | M1 | M1 | E2 | E2 | E2 |

FIG. 6B

| A1 | A1 | A1 | A2 | A2 | A2 | J0 | J0 | J0 |
|----|----|----|----|----|----|----|----|----|
| B1 | B1 | B1 | E1 | E1 | E1 | F1 | F1 | F1 |
| D1 | D1 | D1 | D2 | D2 | D2 | D3 | D3 | D3 |
| H1 | H1 | H1 | H2 | H2 | H2 | H3 | H3 | H3 |
| B2 | B2 | B2 | K1 | K1 | K1 | K2 | K2 | K2 |
| D4 | D4 | D4 | D5 | D5 | D5 | D6 | D6 | D6 |
| RECEIVE TIME STAMP REQUEST ||||||||||
| D10 | D10 | D10 | D11 | D11 | D11 | D12 | D12 | D12 |
| S1 | S1 | S1 | M1 | M1 | M1 | E2 | E2 | E2 |

FIG. 6C

| A1 | A1 | A1 | A2 | A2 | A2 | J0 | J0 | J0 |
|----|----|----|----|----|----|----|----|----|
| B1 | B1 | B1 | E1 | E1 | E1 | F1 | F1 | F1 |
| D1 | D1 | D1 | D2 | D2 | D2 | D3 | D3 | D3 |
| H1 | H1 | H1 | H2 | H2 | H2 | H3 | H3 | H3 |
| B2 | B2 | B2 | K1 | K1 | K1 | K2 | K2 | K2 |
| TIME STAMP BROADCAST ||||||||||
| RECEIVE TIME STAMP REPLY ||||||||||
| S1 | S1 | S1 | M1 | M1 | M1 | E2 | E2 | E2 |

BASE STATION TIMING CONTROL USING SYNCHRONOUS TRANSPORT SIGNALS

BACKGROUND

Wireless systems in the cellular context are currently being implemented using fourth generation (4G) standards. These 4G standards include Long Term Evolution (LTE) standards developed by the 3G Partnership Project (3GPP). LTE cellular systems make use of an Internet protocol (IP) based packet core referred to as Evolved Packet Core (EPC). The EPC interconnects multiple base stations within the system. A given base station, which may also be referred to as a Node B, or more particularly an evolved Node B (eNB), communicates over an air interface with multiple user terminals. Individual user terminals are also referred to as user equipment (UE).

The air interface between an eNB and UE in an LTE cellular system includes a variety of uplink and downlink channels. See, for example, 3GPP TS 36.211, V9.1.0, 3rd Generation Partnership Project Technical Specification, Group Radio Access Network, Evolved Universal Terrestrial Radio Access (E-UTRA), Physical Channels and Modulation (Release 9), March 2010, which is incorporated by reference herein.

In order to support high-speed communications over such uplink and downlink channels, LTE cellular systems and other types of wireless systems often require a highly accurate clock. For example, in LTE Node B applications, the specified clock timing accuracy requirement is about 50 parts per billion (ppb) for frequency accuracy and about 3-10 milliseconds (ms) for phase accuracy. In order to meet this strict clock timing accuracy requirement, each Node B generally must incorporate Global Positioning System (GPS) functionality. However, such arrangements can unduly increase the cost, complexity and power consumption of the Node B. Similar issues arise in other wireless system base stations that rely upon GPS functionality in order to meet their clock timing accuracy requirements.

SUMMARY

Illustrative embodiments of the invention provide timing synchronization in a base station of a wireless system, such as an LTE wireless cellular system. For example, one or more such embodiments may be configured to obtain highly accurate timing information over a synchronous transport signal connection established between the base station and a SONET/SDH network.

In one embodiment, a base station of a wireless system comprises a local clock source and timing circuitry coupled to the local clock source. The timing circuitry is configured to adjust at least one parameter of the local clock source based at least in part on timing information extracted from designated portions of each of one or more frames of a synchronous transport signal received in the base station.

By way of example, the base station may comprise a physical layer device, such as a mapper, configured to extract the timing information from the designated portions of each of the one or more frames of the synchronous transport signal. The designated portions of the one or more frames of the synchronous transport signal from which the timing information is extracted may comprise designated overhead bytes of the one or more frames, such as, for example, transport overhead (TOH) bytes.

One or more embodiments are configured such that a given Node B or other type of base station can utilize an existing SONET/SDH connection to obtain highly accurate timing information. This allows the base station to meet strict clock timing accuracy requirements without the need for GPS functionality, and therefore with less cost, complexity and power consumption than conventional arrangements.

DETAILED DESCRIPTION

Embodiments of the invention will be illustrated herein in conjunction with exemplary wireless systems which include one or more base stations, each configured to communicate over one or more SONET/SDH connections or other types of synchronous transport signal connections. It should be understood, however, that the disclosed synchronous transport signal based timing control techniques are more generally applicable to any wireless system application in which it is desirable to provide highly accurate timing without the use of GPS functionality. For example, the invention can be implemented in a wide variety of other types of wireless systems, including systems outside of the LTE cellular context, such as WiMAX systems, Wi-Fi systems, etc. The term "base station" as used herein is intended to be broadly construed so as to encompass access nodes or other types of access points in these and other types of wireless systems.

Figure 1:
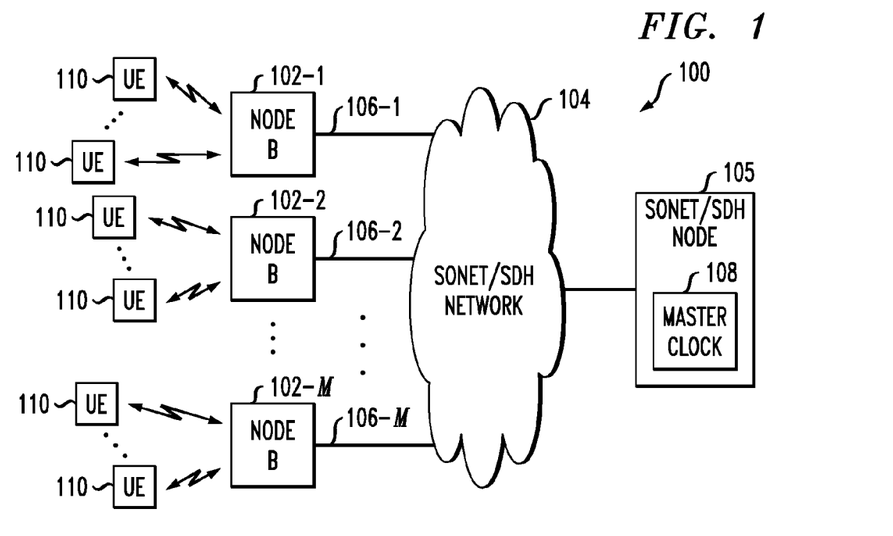
FIG. 1 is a block diagram showing an illustrative embodiment of a wireless system that incorporates improved timing synchronization.

FIG. 1 shows a wireless communication system 100 in an illustrative embodiment. The system 100 includes a plurality of base stations 102-1, 102-2, . . . 102-M, each arranged to communicate with multiple user terminals 110. It is assumed without limitation that the wireless system 100 comprises an LTE cellular system. The base stations 102 are therefore also referred to in this embodiment as respective Node B elements, and may be more particularly referred to as evolved Node B (eNB) elements. The user terminals 110 are also referred to as user equipment (UE). The base stations 102 and user terminals 110 in the system 100 communicate over uplink and downlink channels of the type specified in the 3GPP LTE standards documents, such as the above-cited 3GPP TS 36.211 document.

The base stations 102 are coupled to a SONET/SDH network 104, over which the base stations 102 can access a SONET/SDH node 105 that includes a master clock source 108, also referred to herein in abbreviated form as a master clock. As will be described, one or more of the base stations 102 are each configured to obtain highly accurate timing information from the master clock source 108 over the SONET/SDH network 104 utilizing one or more SONET/SDH connections. For example, the timing information may be sufficiently accurate to allow the base station to meet the specified Node B clock accuracy requirement of about 50 ppb for frequency accuracy and about 3-10 ms for phase accuracy, thereby avoiding the need to incorporate any GPS functionality into the base station. This helps to reduce base station cost, complexity and power consumption.

The SONET/SDH network 104 operates in accordance with at least one of the synchronous transport standards commonly known as synchronous optical network (SONET) and synchronous digital hierarchy (SDH). The SONET standard was developed by the Exchange Carriers Standards Association (ECSA) for the American National Standards Institute (ANSI), and is described at least in part in the standards document ANSI T1.105-1988, entitled "American National Standard for Telecommunications—Digital Hierarchy Optical Interface Rates and Formats Specification" (September 1988), which is incorporated by reference herein. SDH is a corresponding standard developed by the International Telecommunication Union (ITU), set forth in ITU standards documents G.707 and G.708, which are also incorporated by reference herein.

The basic unit of transmission in the SONET standard is referred to as synchronous transport signal level-1 (STS1). It has a serial transmission rate of 51.84 Megabits per second (Mbps). The corresponding unit in the SDH standard is referred to as synchronous transport module level-0 (STM0). Synchronous transport signals at higher levels comprise multiple STS1 or STM0 signals. For example, an intermediate unit of transmission in the SONET standard is referred to as synchronous transport signal level-3 (STS3). It has a serial transmission rate of 155.52 Mbps. The corresponding unit in the SDH standard is referred to as STM1.

A given STS3 or STM1 signal is organized in frames having a duration of 125 microseconds, each of which may be viewed as comprising nine rows by 270 columns of bytes, for a total frame capacity of 2,430 bytes per frame. The first nine bytes of each row comprise transport overhead (TOH), while the remaining 261 bytes of each row are referred to as a synchronous payload envelope (SPE).

Synchronous transport via SONET or SDH generally involves a hierarchical arrangement in which an end-to-end path may comprise multiple lines with each line comprising multiple sections. The TOH includes section overhead (SOH), pointer information, and line overhead (LOH). The SPE includes path overhead (POH). Additional details regarding signal and frame formats can be found in the above-cited standards documents.

In conventional synchronous communications based on the SONET or SDH standards, synchronous transport signals like STS3 or STM1 are mapped to or from corresponding higher-rate optical signals such as a SONET OC-12 signal or an SDH STM4 signal. An OC-12 optical signal carries four STS3 signals, and thus has a rate of 622.08 Mbps. The SDH counterpart to the OC-12 signal is the STM4 signal, which carries four STM1 signals, and thus also has a rate of 622.08 Mbps. The mapping of these and other synchronous transport signals to or from higher-rate optical signals generally occurs in a physical layer device commonly referred to as a mapper, which may be used to implement an add-drop multiplexer (ADM) or other node of a SONET/SDH network.

Such a mapper typically interacts with a link layer processor. A link layer processor is one example of what is more generally referred to herein as a link layer device, where the term "link layer" generally denotes a switching function layer. These and other link layer devices can be used to implement processing associated with various packet-based protocols, such as Internet Protocol (IP) and Asynchronous Transfer Mode (ATM), as well as other protocols, such as Fiber Distributed Data Interface (FDDI). A given mapper or link layer device may be implemented in the form of an integrated circuit.

It should be noted that the term "SONET/SDH" as used herein refers to SONET and/or SDH. Embodiments to be described herein with reference to SDH synchronous transport signal terminology such as STM0 and STM1 should be understood to encompass analogous SONET embodiments using corresponding synchronous transport signal terminology such as STS1 and STS3.

Although shown in the figure as being separate from the SONET/SDH network 104, the node 105 may be viewed as being part of the SONET/SDH network 104. For example, the node 105 may comprise an edge node of network 104. Alternatively, the node may represent a standalone router, switch, network element or other communication device coupled to at least one other node of network 104.

A given one of the user terminals 110 may comprise, by way of example, a mobile telephone, a computer, or any other type of user communication device. The term "user terminal" as used herein is therefore intended to be construed broadly, so as to encompass a variety of different types of mobile stations, subscriber stations or, more generally, communication devices.

It is to be appreciated that the system 100 as illustrated in FIG. 1 is just one exemplary configuration of a wireless system that may incorporate synchronous transport signal based timing control using the techniques disclosed herein, and numerous alternative configurations of system elements may be used in other embodiments. For example, other embodiments of the invention may include additional or alternative elements of a type commonly associated with conventional system implementations. As a more particular example, an evolved packet core (EPC) may be incorporated into the system 100, and may include, among other elements, one or more conventional gateways and mobility management entities of a type well known in the art. Such an EPC may be used to provide connectivity between the base stations 102 and one or more external networks, such as the Internet.

The system 100 may additionally or alternatively be configured to carry circuit-switched traffic such as T1/E1 traffic over a packet network such as an IP network or an ATM network. For example, T1/E1 traffic from a SONET/SDH network or other circuit-switched network may be carried using virtual containers (VCs) that are mapped to packets of an IP network or other packet network. Such VCs contain both POH and payload information. The first column of a given VC is used for the POH, and the remaining 260 columns are the payload, which may comprise one or more containers.

The mapping of VCs or other time-division multiplexed (TDM) data to IP packets or other types of packets may be performed in accordance with a circuit emulation protocol, such as the CEP protocol described in IETF RFC 4842, "Synchronous Optical Network/Synchronous Digital Hierarchy (SONET/SDH) Circuit Emulation over Packet (CEP)," April 2007, which is incorporated by reference herein.

Figure 2:
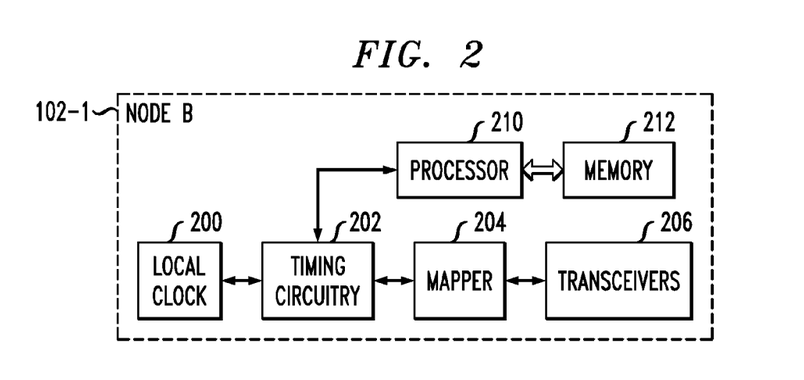
FIG. 2 is a more detailed view of a portion of a base station of the FIG. 1 system.

Referring now to FIG. 2, a portion of a particular one of the base stations 102-1 is shown in greater detail. Base station 102-1 in this embodiment comprises a local clock source 200, also referred to herein in abbreviated form as a local clock, and timing circuitry 202 coupled to the local clock source 200. The timing circuitry 202 is configured to adjust at least one parameter of the local clock source 200 based at least in part on timing information extracted from designated portions of each of one or more frames of a synchronous transport signal received in the base station 102-1 from the SONET/SDH network 104. For example, the timing circuitry may be configured to adjust parameters such as frequency and phase of the local clock source 200. The term "local clock source" as used herein is intended to be broadly construed, so as to encompass, for example, a clock generator, a numerically-controlled oscillator, or any other type of circuitry configured for generating at least one clock signal in the base station 102-1. Also, it should be noted that the "extraction" of timing information from a synchronous transport signal may be accomplished using a wide variety of techniques other than those utilized in the illustrative embodiments.

The base station 102-1 in the present embodiment further comprises a mapper 204 configured to extract the timing information from the designated portions of each of one or more frames of the synchronous transport signal. As mentioned previously, the mapper 204 is an example of what is more generally referred to herein as a "physical layer device," and may be implemented in the form of an integrated circuit. The mapper 204 may include synchronous transport signal mapping functionality of a conventional type. Such synchronous transport signal mapping functionality, being well known to those skilled in the art, will not be described in detail herein, but may include functionality associated with known mappers, such as the LSI Hypermapper™, Ultramapper™ and Supermapper™ devices. These LSI devices are commercially available from LSI Corporation of Milpitas, Calif., U.S.A. Additional details regarding conventional aspects of a mapper such as mapper 204 can be found in, for example, TMXF84622 Ultramapper™ 622/155 Mbits/s SONET/SDH×DS3/E3/DS2/DS1/E1/DS0, Ultramapper™ Resource Document, Jun. 6, 2002, which is incorporated by reference herein. It should be noted that these particular mapper integrated circuits are not required, and this embodiment can be implemented using any device capable of performing SONET/SDH mapping.

The term "timing circuitry" as used herein is also intended to be broadly construed, and in other embodiments may encompass at least a portion of the mapper 204, or other type of circuitry utilize to extract timing information from one or more frames of a synchronous transport signal.

Also included in base station 102-1 are transceivers 206, which may comprise uplink receiver and downlink transmitter elements and related components of a conventional nature for supporting communications with the user terminals 110 over uplink and downlink channels within the system 100.

One or more other base stations 102 of system 100 may also be configured in a manner similar to that shown in FIG. 2 for base station 102-1. Thus, in the present embodiment, timing information from the high accuracy master clock 108 may be provided to each of the base stations 102 of system 100. Each of the base stations receiving this timing information adjusts its local clock so as to meet the Node B clock timing accuracy requirement.

Also, a given such base station may include additional or alternative components, such as, for example, a link layer processor associated with the mapper 204. In such an arrangement, the mapper may communicate with a virtual container interface, container interface or other type of interface of the link layer processor. As indicated above, the link layer processor is an example of what is more generally referred to herein as a "link layer device," which should be understood to encompass any type of processing device which performs processing operations associated with a link layer of a synchronous transport network.

In the present embodiment, the synchronous transport signal may be received in the base station 102-1 over a synchronous network connection established between the base station 102-1 and the SONET/SDH node 105. The timing information in such an arrangement is traceable to master clock source 108 associated with the node 105.

As will be described, the designated portions of the one or more frames of the synchronous transport signal from which the timing information is extracted may comprise designated overhead bytes of the one or more frames, and in the present embodiment comprise TOH bytes of the one or more frames.

The base station 102-1 further comprises a processor 210 coupled to a memory 212. At least a portion of the timing circuitry 202 may be implemented as one or more processing modules, each comprising computer program code that is stored in the memory 212 and executed by the processor 210. The processor and memory elements of the base station 102-1 may represent respective generalized processing and memory resources of the base station that perform operations for multiple base station components.

The processor 210 may comprise, for example, one or more microprocessors, application-specific integrated circuits (ASICs), field-programmable gate arrays (FPGAs), digital signal processors (DSPs), systems-on-chip (SOCs) or other types of processing devices, as well as portions or combinations of such elements.

The memory 212 may comprise, for example, electronic memory such as random access memory (RAM) or read-only memory (ROM), magnetic memory, optical memory or other types of storage elements, as well as portions or combinations of such elements. System memory elements such as memory 212 are considered examples of what are also referred to herein as computer-readable storage media that store computer program code, or more generally computer program products having executable program code embodied therein. Such program code when executed in the base station 102-1 of the wireless system 100 causes the base station to perform at least a portion of the synchronous transport signal based timing control functionality of the base station. Thus, timing control circuitry as that term is used herein may encompass circuitry associated with processor 210 and memory 212.

Although only single instances of the local clock 200, timing circuitry 202, mapper 204, transceivers 206, processor 210 and memory 212 are shown in the FIG. 2 embodiment, other embodiments may comprise multiple instances of these and other system elements. For example, a group of multiple mappers may be arranged in a master-slave configuration that includes at least one master mapper and a plurality of slave mappers. Other embodiments may include only a single slave mapper, rather than multiple slave mappers. Numerous other configurations of these and other base station elements are possible, as will be appreciated by those skilled in the art.

Figure 3:
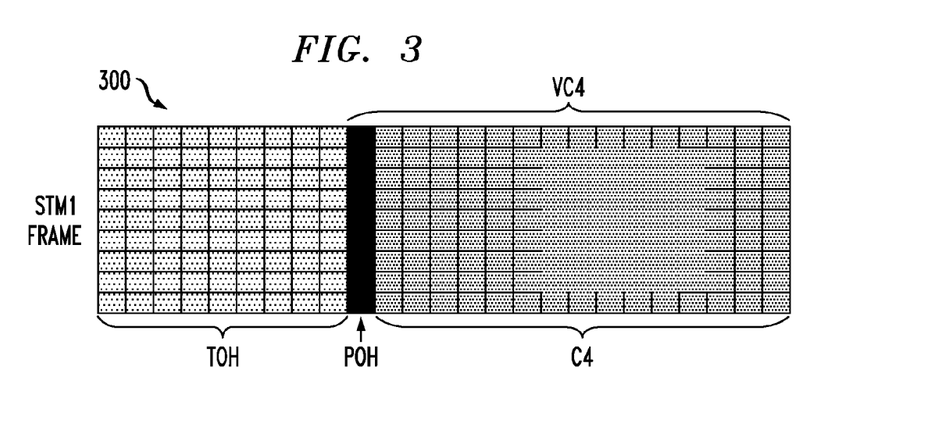
FIG. 3 shows a synchronous transport signal frame processed in the FIG. 1 system.

FIG. 3 shows an example of a synchronous transport signal frame 300, in this case an SDH STM1 frame that includes a virtual container frame denoted VC4. The STM1 frame comprises the data payloads of three STM0 signals, and is organized in the form of array of bytes, having nine rows and 270 columns, such that the entire STM1 frame comprises a total of 2,430 bytes. The first nine bytes of each row of the frame comprise TOH, while the remaining 261 bytes of each row comprise the virtual container frame VC4. The virtual container frame VC4 comprises one column of POH, followed by a container frame C4 having 260 columns.

Virtual container frames such as VC4 may be configured to carry multiple tributary units (TUs) that are arranged in TU groups (TUGs). More specifically, the VC4 frame may comprise three TUG3s (TUG3×3), with each TUG3 possibly having a different arrangement of TUs. Thus, the C4 frame may be mapped from a TUG3×3.

As indicated previously, the SONET counterpart of the SDH STM1 frame is referred to as an STS3 frame, and it may be configured in substantially the same manner as the STM1 frame illustrated in FIG. 3.

It is to be appreciated that the particular synchronous transport frame format shown in FIG. 3 is presented by way of illustrative example only, and numerous other types of synchronous transport frames may be used in other embodiments.

Figure 4:
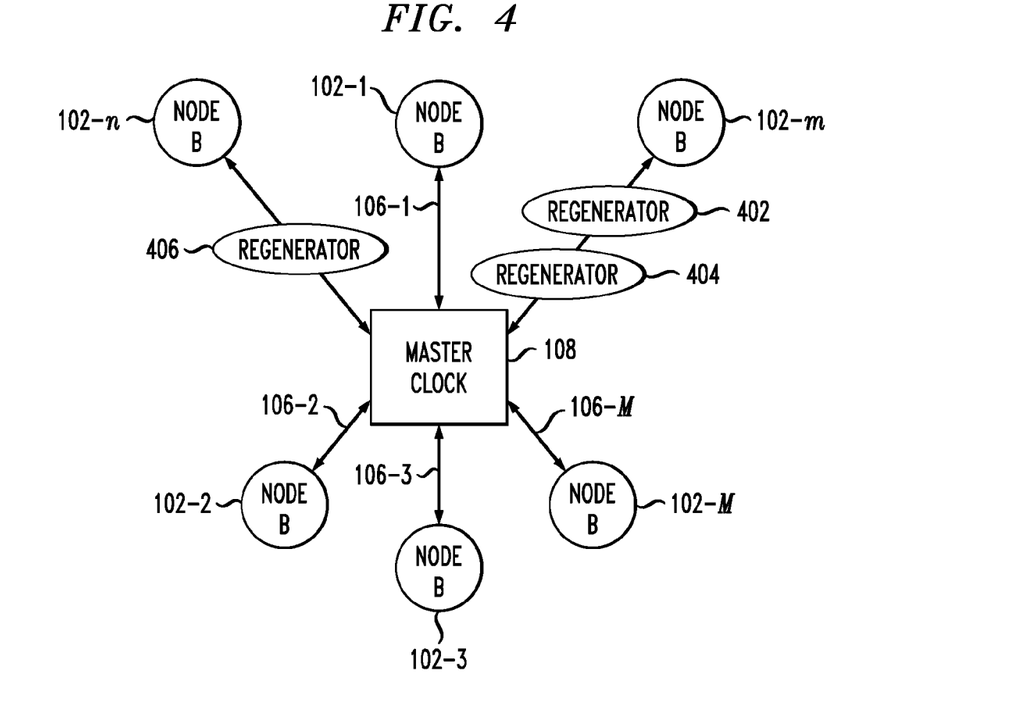
FIG. 4 illustrates interconnection between certain base stations and the master clock of the FIG. 1 system.

FIG. 4 illustrates one possible configuration of system 100 of FIG. 1 in which timing information is conveyed from the master clock 108 of SONET/SDH node 105 in synchronous transport signal frames of the type described in conjunction with FIG. 3. In this embodiment, the base stations 102 each have a direct connection over SONET/SDH network 104 to master clock 108 and its associated SONET/SDH node 105. Such a direct connection may be viewed as indicating that there is no SONET/SDH path terminating element (PTE), such as an ADM, arranged between the master clock 108 and a given one of the base stations 102.

Thus, one or more SONET/SDH regenerators may be inserted between the master clock 108 and each of at least a subset of the base stations 102. In this embodiment, two regenerators 402 and 404 are inserted in series between the master clock 108 and the base station 102-m, and a single regenerator 406 is inserted between the master clock 108 and the base station 102-n. There are no regenerators in the paths 106-1, 106-2, 106-3 and 106-M between the master clock 108 and any of the other respective base stations 102-1, 102-2, 102-3 and 102-M that are shown in FIG. 4.

Figure 5:
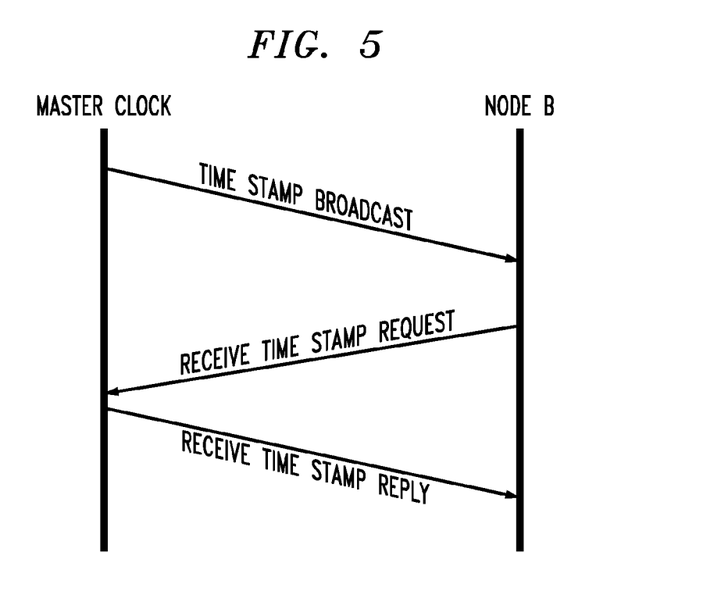
FIG. 5 is a signal flow diagram showing how timing information is obtained by a given base station from the master clock in one embodiment.

The flow of timing information between the master clock 108 of SONET/SDH node 105 and a given one of the base stations 102 is illustrated in FIG. 5. Again, in this embodiment, it may be assumed that the base station has a direct connection over the SONET/SDH network 104 to the SONET/SDH node 105 that contains the master clock 108, although indirect connections may be used in other embodiments. Time stamp broadcast information derived from the master clock 108 is periodically transmitted to the base station from the SONET/SDH node 105 in each of a plurality of synchronous transport signal frames, using respective time stamp broadcast messages. After receiving a given such time stamp broadcast message, the base station transmits a receive time stamp request message to the SONET/SDH node 105 that contains the master clock 108. The SONET/SDH node 105 responds to the request message by transmitting a receive time stamp reply message back to the base station as indicated. Thus, timing information indicated as flowing from the master clock in FIG. 5 may more generally be transmitted by the associated SONET/SDH node 105, under control of associated timing circuitry of that node, rather than by the master clock source itself.

The time stamp broadcast message may be transmitted in TOH bytes in each of a plurality of synchronous transport frames and indicates the absolute time at which the corresponding synchronous transport frame is transmitted by the SONET/SDH node 105. As SONET/SDH typically has a maximum frame rate of 8,000 frames per second, each base station 102 may receive the time stamp broadcast message at most 8,000 times per second. However, because the SONET/SDH network 104 has static delay and low jitter, the receiving base station is able to utilize the time stamp broadcast message to synchronize the frequency of its local clock to the master clock with high accuracy, and to determine a coarse estimate of the absolute time. This coarse estimate of the absolute time is further processed using the receive time stamp request and reply messages, as will be described below.

The receive time stamp request message sent by the base station includes a frame sequence number. The SONET/SDH node 105 records the time at which it receives the frame which contains the receive time stamp request message. The receive time stamp reply message sent by the SONET/SDH node 105 back to the base station contains the request sequence number that was in the request that triggered the reply, as well as the time at which the SONET/SDH node received the corresponding frame from the base station. The FIG. 5 arrangement therefore allows the base station to determine the delay time between itself and the SONET/SDH node 105. This delay time is utilized by the base station to update the coarse estimate of the absolute time previously obtained by the base station using the time stamp broadcast, thereby allowing the base station to obtain a highly accuracy absolute time estimate as well as to achieve high phase accuracy in its local clock.

It should be noted that local timing adjustment operations referred to above as being performed by the base station may be more particularly performed by the timing circuitry 202 of the base station.

As indicated previously, the timing information transmitted between the SONET/SDH node 105 and the base station using the messages shown in FIG. 5 is embedded into overhead bytes of synchronous transport signal frames, and more particularly into TOH bytes of these frames.

Figure 6A:
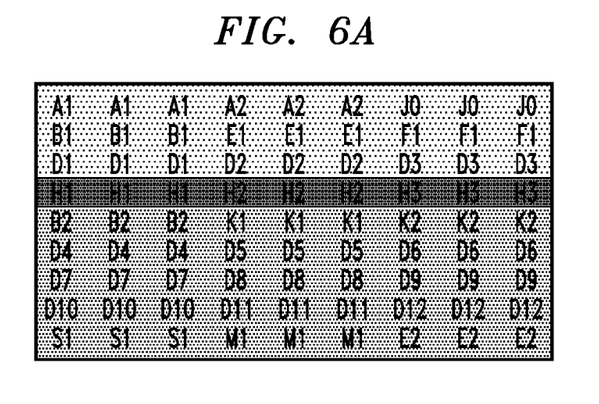
FIGS. 6A, 6B and 6C illustrate the use of transport overhead bytes of synchronous transport frames to carry timing information in one embodiment.

The particular manner in which the timing information may be embedded into the TOH bytes in an illustrative embodiment will now be described with reference to FIGS. 6A through 6C. FIG. 6A shows the TOH bytes of the STM1 frame 300 of FIG. 3 in greater detail. The TOH bytes of a single STM1 frame are arranged in nine rows and nine columns, for a total of 81 bytes, as illustrated in FIG. 6A.

In the present embodiment, bytes D4 through D12 are utilized to convey the timing information between the SONET/SDH node 105 and the base station. More particularly, the receive time stamp request message of FIG. 5, transmitted by the base station to the SONET/SDH node 105, is transmitted using the D7 through D9 bytes of an STM1 frame, as illustrated in FIG. 6B. As indicated previously, this receive time stamp request message includes the sequence number of the STM1 frame in which the message is transmitted.

Figure 6B:
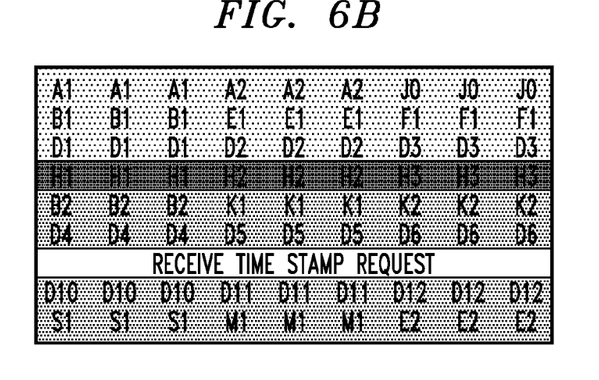
Figure 6C:
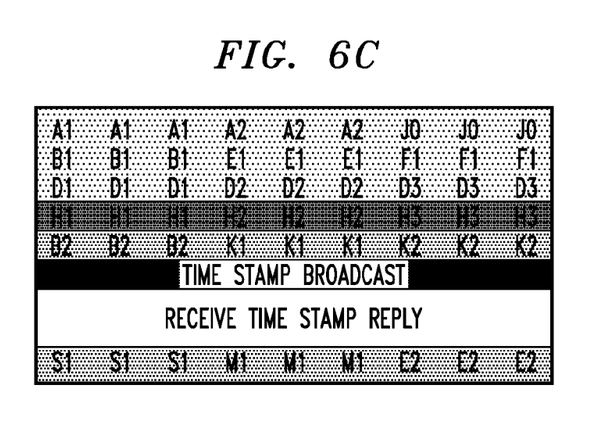

The time stamp broadcast message and receive time stamp reply message of FIG. 5 are transmitted by the SONET/SDH node 105 to the base station using bytes D4 through D6 and D7 through D12, respectively, as illustrated in FIG. 6C. For the time stamp broadcast message, bytes D4 through D6 convey the absolute time when the corresponding STM1 frame was transmitted by SONET/SDH node 105. For the receive time stamp reply message, bytes D7 through D9 denote the sequence number of the STM1 frame in which the receive time stamp request message was received from the base station, and bytes D10 through D12 convey the absolute time when that message was received.

Thus, the FIG. 5 timing messages consume a maximum total bandwidth of 27 bytes per frame, which corresponds to a data rate of 216 kilobytes per second (KB/s). The D4 through D12 bytes utilized to convey timing information in the present embodiment are considered user-defined bytes in accordance with the SONET/SDH standards.

The mapper 204 in the present embodiment may be assumed to include transmit and receive transport overhead access (TOAC) interfaces configured to enable respective inserting and dropping of TOH bytes of the type described above at the base station 102-1. A similar mapper is assumed to be associated with timing circuitry of the SONET/SDH node 105, as will be described. The use of the TOAC interfaces in one or more embodiments herein is beneficial in that such interfaces are generally close to the front end of the SONET/SDH connection and therefore usually exhibit high precision and low delay.

The absolute time conveyed in the time stamp broadcast message and the receive time stamp reply message may specify at least year, month, day, minute, second, millisecond, microsecond and nanosecond. For example, 7 bits can be used to denote the year, 4 bits for month, 5 bits for day, 5 bits for hour, 6 bits for minute, 6 bits for second, 10 bits for millisecond, 10 bits for microsecond and 10 bits for nanosecond, which would require a total of only 63 bits of the 72 bits available for transmission of timing information in the D4 through D6 bytes or the D10 through D12 bytes. Such an arrangement allows the absolute time to be specified to an accuracy of 1 nanosecond. However, numerous other arrangements may be used to convey the absolute time from the master clock 108 of the SONET/SDH node 105 to the base station 102-1, using different levels of accuracy than that used in the example above.

Also, it should be understood that the term "timing information" as used herein is not limited to absolute time, and may include additional or alternative information that may be used in adjusting a local clock. For example, the sequence number of a transmitted frame may be considered a type of timing information as the latter term is broadly used herein.

The communications between the base station 102-1 and the SONET/SDH node 105 will now be further described with reference to FIGS. 7 and 8. This embodiment assumes a direct SONET/SDH connection between the base station and the SONET/SDH node, of the type previously described in conjunction with FIG. 4.

Figure 7:
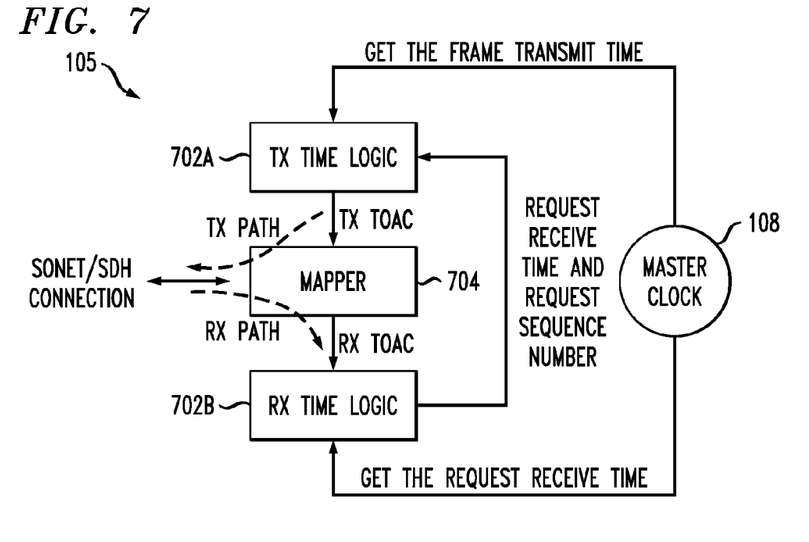
FIGS. 7 and 8 show respective configurations of a SONET/SDH node and a base station in the FIG. 1 system in an embodiment in which there is a direct connection between the base station and the SONET/SDH node.

Referring initially to FIG. 7, the SONET/SDH node 105 in this embodiment more particularly comprises timing circuitry 702 that includes transmit (TX) time logic 702A and receive (RX) time logic 702B, both coupled to the master clock source 108. The node 105 further comprises a mapper 704, which is assumed to have TOAC interfaces for dropping and inserting of TOH bytes. More specifically, the mapper 704 has a TX TOAC interface that allows timing information from TX time logic 702A to be inserted into TOH bytes of an STM1 frame to be transmitted by the node 105, via a mapper TX path and the above-noted SONET/SDH connection, to the base station 102-1. The mapper 704 also includes a RX TOAC interface that allows timing information received in TOH bytes of an STM1 frame from the base station 102-1, via the SONET/SDH connection and a mapper RX path, to be dropped at node 105 for further processing by the RX time logic 702B.

Each time a receive time stamp request message is received, the RX time logic 702B will determine the sequence number and the receive time for that message, and provide this information to the TX time logic 702A.

In generating a time stamp broadcast message, the TX time logic 702A obtains the transmit time for a current STM1 frame from the master clock 108 and provides it to the TX TOAC interface of the mapper 704 for insertion into TOH bytes D4 through D6 of the current STM1 frame.

In generating a receive time stamp reply message, the TX time logic 702A interacts with the mapper 704 via the TX TOAC interface. More particularly, the receive time of the corresponding receive time stamp request message is inserted into TOH bytes D10 through D12, and the sequence number from that receive time stamp request message is inserted into TOH bytes D7 through D9, in order to form the receive time stamp reply message to be sent back to the base station 102-1.

Figure 8:
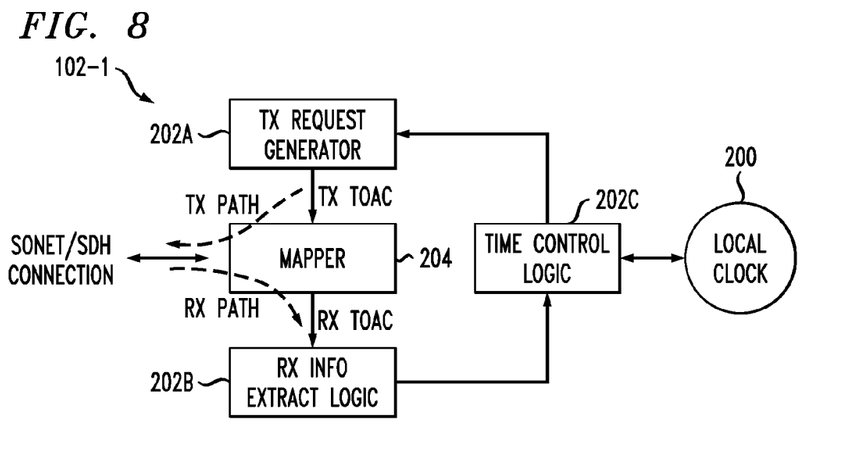

FIG. 8 illustrates the corresponding processing performed in the base station 102-1. In this embodiment, the timing circuitry 202 more particularly comprises TX request generator 202A, RX information extraction logic 202B, and local time control logic 202C. The local time control logic 202C is coupled to the local clock 200 and to both the TX request generator 202A and the RX information extraction logic 202B. As mentioned above, the mapper 204 comprises TOAC interfaces for dropping and inserting of TOH bytes. More specifically, the mapper 204 has a TX TOAC interface that allows timing information from TX request generator 202A to be inserted into TOH bytes of an STM1 frame to be transmitted by the base station 102-1, via a mapper TX path and the above-noted SONET/SDH connection, to the SONET/SDH node 105. The mapper 204 also includes a RX TOAC interface that allows timing information received in TOH bytes of an STM1 frame from the SONET/SDH node 105, via the SONET/SDH connection and a mapper RX path, to be dropped at base station 102-1 for further processing by the RX information extraction logic 202B.

The base station 102-1 as shown in FIG. 8 processes the time stamp broadcast and receive time stamp reply messages received from SONET/SDH node 105. More particularly, the absolute time of the time stamp broadcast message is extracted from TOH bytes D4 through D6 using mapper 204 and RX information extraction logic 202B, and provided to the local time control logic 202C. A similar extraction of absolute time is performed using TOH bytes D10 through D12 of the receive time stamp reply message.

The local time control logic 202C also controls the TX request generator 202A to generate the receive time stamp request message for transmission to the SONET/SDH node 105. As indicated previously, this message will include the sequence number of the STM1 frame in which the message is transmitted. The local time control logic 202C utilizes the absolute time received in the time stamp broadcast and receive time stamp reply messages as well as the sequence number from the receive time stamp reply message to make an appropriate adjustment to the local clock 200 so as to synchronize the local clock with the master clock 108.

The embodiment described in conjunction with FIGS. 7 and 8 utilizes a direct SONET/SDH connection between the base station 102-1 and the node 105 to convey timing information. However, other embodiments do not require the use of a direct SONET/SDH connection of this type. An example of such an arrangement will now be described with reference to FIGS. 9 through 12.

Figure 9:
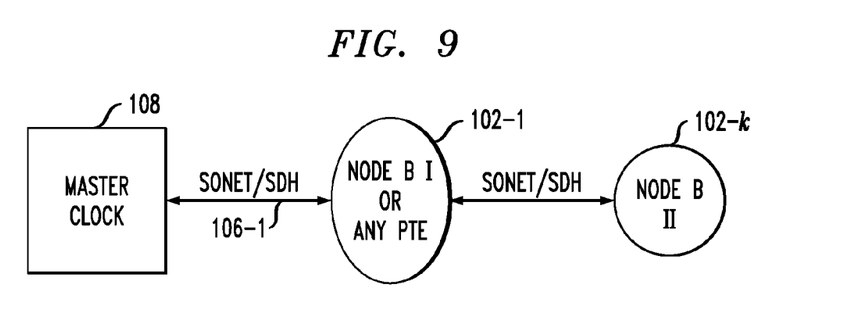
FIG. 9 illustrates a type of indirect connection between a base station and the master clock in the FIG. 1 system.

Referring initially to FIG. 9, one type of indirect connection that may exist in system 100 between one of the base stations 102 and the master clock 108 is shown. In this indirect connection example, a base station 102-k has an indirect connection with the master clock 108 via another base station 102-1. Alternatively, the indirect connection may be via another type of SONET/SDH PTE. The base stations 102-1 and 102-k are also referred to in the context of this embodiment as Node B I and Node B II, respectively. Thus, Node B I has a direct connection to the master clock 108 via SONET/SDH connection 106-1, and Node B II is connected to the master clock through Node B I. Node B I in this embodiment may be assumed to operate as an ADM. Thus, it may be configured to drop one or more tributaries received from an upstream node, to replace the dropped tributaries with tributaries that it generates, and to send a resulting re-mapped frame to a downstream node.

In the present embodiment, the time stamp broadcast message from the SONET/SDH node 105 can be directly relayed by Node B I in TOH bytes to Node B II. However, in order to provide the receive time stamp request message from Node B II to the node 105, Node B II can first map it to a tributary, such as a VC11 tributary, and then send that tributary to node 105 via Node B I. Similarly, node 105 can map the corresponding receive time stamp reply message to a tributary and send it back to Node B II via Node B I.

It should be noted that, because tributaries are not overhead but are instead typically used to carry payload, an arrangement of this type may consume additional bandwidth relative to the TOH-based embodiments previously described in conjunction with FIGS. 6-8. It was indicated previously that the absolute time with accuracy to 1 nanosecond can be conveyed using 63 bits. Assuming a 9-bit sequence number, the total bandwidth of a receive time stamp reply message is 72 bits or 9 bytes. Since the maximum frame rate in SONET/SDH is 8,000 frames per second, the total bandwidth cost attributed to transmission of timing information in one direction is at most 72 KB/s.

As a more particular example, assume that the mapping process utilized in this embodiment is DS0→DS1→VC11→VC3→STS3 mapping, where STS3 denotes the SONET equivalent of the STM1 synchronous transport frame. In this case, the receive time stamp reply message will consume 9 DS0 time slots, as each time slot can carry one byte. Each STS3 frame may be configured to include 3 VC3s, where each VC3 has 84 VC11s and each VC11 has 24 DS0 time slots. Accordingly, a single STS3 frame of this type carries a total of 6048 DS0 time slots, and the timing information will consume at most 9 of these time slots. The bandwidth cost associated with transmission of the timing information in this embodiment is therefore still relatively low.

Figure 10:
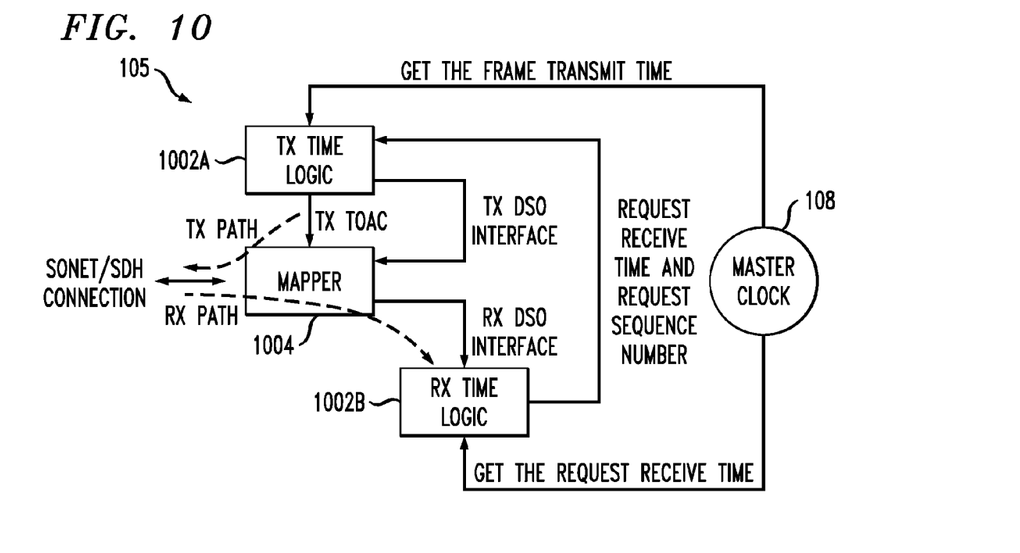
FIGS. 10 and 11 show respective configurations of a SONET/SDH node and a base station in the FIG. 1 system in an embodiment in which there is an indirect connection between the base station and the SONET/SDH node.
Figure 11:
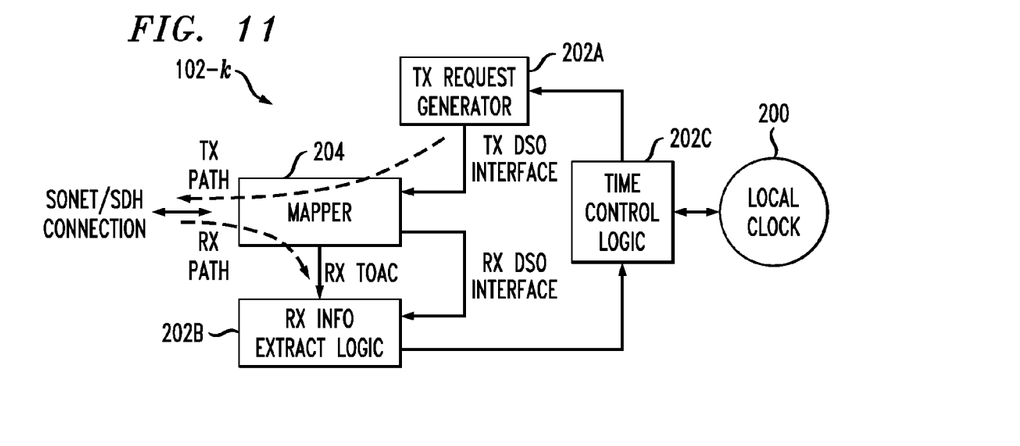
Figure 12:
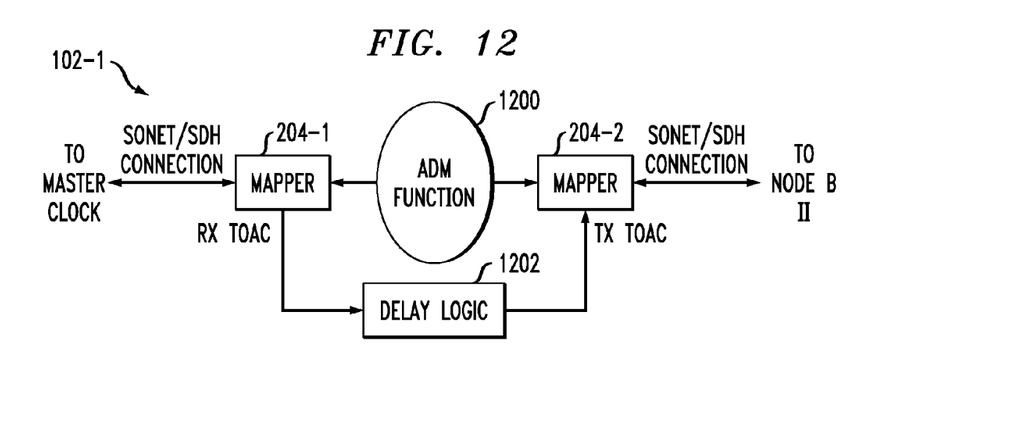
FIG. 12 illustrates the configuration of an intervening base station in the indirect connection embodiment of FIGS. 10 and 11.

FIGS. 10, 11 and 12 illustrate the configuration of the respective SONET/SDH node 105, Node B II base station 102-k and Node B I base station 102-1 of FIG. 9 in implementing the embodiment described above. It is assumed in this embodiment that mappers implemented in at least the base station 102-k and in the SONET/SDH node 105 can directly process DS0 time slots, using TX and RX DS0 interfaces.

Referring now to FIG. 10, the SONET/SDH node 105 in this embodiment comprises timing control circuitry 1002 that includes TX time logic 1002A and RX time logic 1002B, both coupled to the master clock source 108. The node 105 further comprises a mapper 1004, which is assumed to have a TX TOAC interface and TX and RX DS0 interfaces as shown. The TX time logic 1002A is coupled to the TX TOAC and TX DS0 interfaces of the mapper 1004, and the RX time logic 1002B is coupled to the RX DS0 interface of the mapper 1004.

Each time a receive time stamp request message is received, the RX time logic 1002B will determine the sequence number and the receive time, and provide this information to the TX time logic 1002A.

In generating a time stamp broadcast message, the TX time logic 1002A obtains the transmit time for a current STM1 frame from the master clock 108 and provides it to the TX TOAC interface of the mapper 1004 for insertion into TOH bytes D4 through D6 of the current STM1 frame. This operation is similar to that previously described in conjunction with the embodiment of FIG. 7.

In generating a receive time stamp reply message, the TX time logic 1002A interacts with the mapper 1004 via the TX DS0 interface. More particularly, the receive time of the corresponding receive time stamp request message and the sequence number from that message are inserted into DS0 time slots as previously described, in order to form the receive time stamp reply message.

FIG. 11 shows the configuration of the Node B II base station 102-k in the present embodiment. Its configuration is similar to the base station configuration previously described in conjunction with FIG. 8, except that TX request generator 202A and RX information extraction logic are coupled to respective TX and RX DS0 interfaces of the mapper 204. The mapper also has a RX TOAC interface with the RX information extraction logic 202B. The absolute time is extracted from the time stamp broadcast message via the RX TOAC interface and the receive time and sequence number are extracted from the receive time stamp reply via the RX DS0 interface. This timing information is provided to the local time control logic 202C for use in adjusting the timing of the local clock source 200. The local time control logic 202C also controls the TX request generator 202A to generate the receive time stamp request message which is provided to the mapper 204 via the TX DS0 interface.

Turning now to FIG. 12, the configuration of the Node B I base station 102-1 in the present embodiment is shown in greater detail. The base station in this embodiment comprises a pair of mappers, with one mapper 204-1 being coupled to the master clock 108 of node 105, and the other mapper 204-2 being coupled to the Node B II base station 102-k. As mentioned previously, the receive time stamp request and receive time stamp reply messages in this embodiment are embedded in tributaries, and therefore are processed using ADM function 1200 in a manner similar to the processing of normal payload information. The time stamp broadcast message is extracted from the RX TOAC interface of the first mapper 204-1 and after being subject to delay in delay logic 1202 is inserted into an outgoing frame via the TX TOAC interface of the second mapper 204-2 for transmission to the Node B II base station. The delay added by the delay logic 1202 should be substantially equivalent to the delay added by the ADM function 1200.

The illustrative embodiments described above provide highly accurate timing control for Node B elements and other types of wireless system base stations, where the base stations may be directly or indirectly interconnected using a variety of different types of SONET/SDH architectures. The timing control in these embodiments has low bandwidth requirements. Moreover, it avoids the need for GPS functionality, thereby reducing the cost, complexity and power consumption of the base station.

It is to be appreciated that the particular system, circuitry, messaging and timing information arrangements shown in FIGS. 1-12 may be varied in other embodiments. Numerous alternative arrangements of hardware, software and firmware in any combination may be used to implement the described timing control functionality.

Also, although described primarily in the context of an STM1 or STS3 synchronous transport frame, the disclosed techniques can be adapted for use with a wide variety of other types of synchronous transport signal information.

It should be noted that the portions of the timing circuitry 202, and possibly other components of the base station 102-1, may be implemented at least in part in the form of one or more software programs running on a processor. The memory 212 associated with the processor 210 may be used to store executable program code of this type. Such a memory is an example of what is more generally referred to herein as a "computer program product" having executable computer program code embodied therein. The computer program code when executed in processor 210 causes the base station to perform one or more operations associated with timing circuitry 202. Other examples of computer program products in embodiments of the invention may include, for example, optical or magnetic disks.

Similar processor and memory elements may be used to implement timing circuitry and other components of the SONET/SDH node 105.

Timing circuitry or portions thereof in accordance with embodiments of the invention may be implemented in the form of one or more integrated circuits suitable for installation within base station equipment. Thus, timing circuitry such as 202, 702 or 1002 may each be implemented as a separate integrated circuit, or as a combination of multiple integrated circuits. Numerous other configurations are possible.

In a given integrated circuit implementation, identical die are typically formed in a repeated pattern on a surface of a semiconductor wafer. Each die includes at least timing circuitry as described herein, and may include other structures or circuits. The individual die are cut or diced from the wafer, then packaged as an integrated circuit. One skilled in the art would know how to dice wafers and package die to produce integrated circuits. Integrated circuits so manufactured are considered embodiments of the invention.

Also, although described primarily in the context of Node B timing control in an LTE wireless cellular system, the disclosed techniques can be adapted for use with a wide variety of other types of systems, including systems outside of the cellular context. More generally, the disclosed synchronous transport signal based timing control functionality can be used to provide timing control in any device that requires one or more highly accurate clock signals and has access to a synchronous transport connection. Accordingly, the disclosed techniques are not limited for use with wireless system access nodes, access points or other types of base stations, but can be applied in other types of network nodes or devices that require highly accurate clock signals.

Again, it should be emphasized that the embodiments described herein are intended to be illustrative only. For example, the particular arrangement of base stations, user terminals, networks, and other system elements as shown in FIG. 1 may be varied in alternative embodiments. Also, other types of circuitry elements or processing modules may be used to implement timing control functionality as disclosed herein. These and numerous other alternative embodiments within the scope of the following claims will be readily apparent to those skilled in the art.

What is claimed is:

1. An apparatus comprising:
a base station of a wireless system, the base station comprising:
a local clock source; and
timing circuitry coupled to the local clock source and configured to:
receive first timing information in a first synchronous transport signal sent from a network node with a master clock source;
send a request in a second synchronous transport signal to the network node with the master clock source;
receive second timing information in a third synchronous transport signal sent from the network node with the master clock source, wherein each of the receiving the first timing information, the sending the request, and the receiving the second timing information use a designated portion of each of one or more frames of the respective synchronous transport signal; and
adjust at least one parameter of the local clock source based at least in part on the first timing information or the second timing information extracted from the designated portion of each of said one or more frames of the respective first synchronous transport signal or the second synchronous transport signal received in the base station.

2. The apparatus of claim 1, wherein the base station further comprises a physical layer device configured to extract the first timing information or the second timing information from one or more bytes dropped from the designated portion of each of said one or more frames of the respective first synchronous transport signal or the second synchronous transport signal received in the base station, and wherein the physical layer device is further configured to insert the request into the designated portion of each of said one or more frames of the second synchronous transport signal.

3. The apparatus of claim 2, wherein the physical layer device comprises a mapper having at least one transmit and receive transport overhead access (TOAC) interface configured to enable the respective extracting of the first timing information or the second timing information, inserting of the request, and dropping of the one or more bytes, the one or more bytes being transport overhead bytes.

4. The apparatus of claim 1, wherein the first, second, and third synchronous transport signals are communicated over a synchronous optical network (SONET) connection or a synchronous digital hierarchy (SDH) connection established between the base station and the network node.

5. The apparatus of claim 4, wherein the first timing information or the second timing information is traceable to the master clock source.

6. The apparatus of claim 1, wherein the designated portion of said one or more frames of the respective synchronous transport signal from which the timing information is extracted comprises one or more designated overhead bytes of said one or more frames.

7. The apparatus of claim 6, wherein the one or more designated overhead bytes comprise transport overhead (TOH) bytes of said one or more frames, wherein the TOH bytes comprise section overhead (SOH), pointer information, and line overhead (LOH).

8. The apparatus of claim 1, wherein the network node is a synchronous network node, and wherein the first timing information comprises time stamp broadcast information transmitted to the base station from the network node.

9. The apparatus of claim 1, wherein the network node is a synchronous network node and the request is a receive time stamp request, and wherein the second timing information comprises a receive time stamp reply received in the base station from the network node responsive and corresponding to the request.

10. The apparatus of claim 9, wherein both the receive time stamp request and the corresponding receive time stamp reply comprise a frame sequence number identifying a particular synchronous transport signal frame in which the receive time stamp request was transmitted by the base station to the synchronous network node.

11. The apparatus of claim 1, wherein the first timing information and the second timing information comprises an absolute time indicator specifying at least a subset of year, month, day, minute, second, millisecond, microsecond and nanosecond.

12. The apparatus of claim 1, wherein the base station is a component of a wireless system with an accuracy specified to 50 ppb for a frequency and 3 ms to 10 ms for a phase of the local clock source.

13. The apparatus of claim 1, wherein the base station further comprises:
a processor; and
a memory coupled to the processor;
wherein at least a portion of the timing circuitry is implemented as one or more processing modules each comprising programmed instructions that are stored in the memory and executed by the processor.

14. An apparatus comprising:
timing circuitry adapted for coupling to a local clock source of a base station and configured to:
receive first timing information in a first synchronous transport signal sent from a network node with a master clock source;
send a request in a second synchronous transport signal to the network node with the master clock source;
receive second timing information in a third synchronous transport signal sent from the network node with the master clock source, wherein each of the receiving the first timing information, the sending the request, and the receiving the second timing information use a designated portion of each of one or more frames of the respective synchronous transport signal; and
adjust at least one parameter of the local clock source based at least in part on the first timing information or the second timing information extracted from the respective synchronous transport signal received in the base station.

15. The apparatus of claim 14, wherein the timing circuitry adapted for coupling to the local clock source of the base station is a component of an integrated circuit, and wherein the first timing information comprises a time stamp broadcast and the second timing information comprises a receive time stamp reply received in response to the request, and wherein the receive time stamp reply is received (i) in designated transport overhead (TOH) bytes of said one or more frames of the second synchronous transport signal when the base station is directly connected to the network node and (ii) in designated tributary units of said one or more frames of the second synchronous transport signal when the base station is indirectly connected to the network node.

16. A method comprising:
receiving first timing information in a first synchronous transport signal sent from a network node with a master clock source;
sending a request in a second synchronous transport signal to the network node with the master clock source;
receiving second timing information in a third synchronous transport signal sent from the network node with the master clock source, wherein each of the receiving the first timing information, the sending the request, and the receiving the second timing information use a designated portion of each of one or more frames of the respective synchronous transport signal; and
adjusting at least one parameter of a local clock source of the base station based at least in part on extracted first timing information or extracted second timing information.

17. The method of claim 16, wherein the designated portion of each of said one or more frames of the respective synchronous transport signal comprises designated overhead bytes of said one or more frames.

18. The method of claim 17, wherein the designated overhead bytes comprise transport overhead (TOH) bytes of said one or more frames.

19. The method of claim 16, wherein the method comprises one or more steps stored in a memory, the memory having executable programmed instructions embodied therein, the memory operably coupled to a processor, the processor implemented within a base station, wherein the programmed instructions when executed in the processor cause the base station to perform the one or more steps.

20. A wireless system comprising:
a plurality of base stations having respective synchronous network interfaces, one or more of the respective synchronous network interfaces being adapted for direct and indirect communication of timing information, the one or more respective synchronous network interfaces adapted for direct and indirect communication of timing information comprise:
timing circuitry adapted for coupling to a local clock source of the respective base station and configured to receive first timing information in a first synchronous transport signal sent from a network node with a master clock source, send a request in a second synchronous transport signal to the network node with the master clock source, and receive second timing information in a third synchronous transport signal sent from the network node with the master clock source, wherein each of the receiving the first timing information, the sending the request, and the receiving the second timing information use a designated portion of each of one or more frames of the respective synchronous transport signal, and
wherein the timing circuitry is further configured to adjust at least one parameter of the local clock source based at least in part on said first timing information or said second timing information extracted from the designated portion of each of said one or more frames of the respective synchronous transport signal received in the base station.

* * * * *